(12) United States Patent
Shute et al.

(10) Patent No.: US 6,581,732 B1
(45) Date of Patent: Jun. 24, 2003

(54) KEYLESS ATTACHMENT OF BRAKE SHOES

(75) Inventors: Bruce W. Shute, West End, NC (US); Timothy Rumph, Laurel Hill, NC (US); Thomas W. McCabe, Southern Pines, NC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/178,397

(22) Filed: Jun. 24, 2002

(51) Int. Cl.[7] ............................................... F16D 65/04
(52) U.S. Cl. .................................... 188/242; 188/250 B
(58) Field of Search ................................. 188/234–248

(56) References Cited

U.S. PATENT DOCUMENTS 5,595,267 A * 1/1997 Kahr ........................ 188/261
5,647,460 A * 7/1997 Shute ........................ 188/243
6,135,249 A * 10/2000 Kahr ........................ 188/242
6,241,058 B1 * 6/2001 Shute et al. ............ 188/250 B

* cited by examiner

Primary Examiner—Christopher P. Schwartz
(74) Attorney, Agent, or Firm—James Ray and Associate

(57) ABSTRACT

A brake shoe adapted to engage the tread of a railroad car wheel via which such railroad car is guidably supported on a railed track. The brake shoe comprises a backing plate which has a predetermined configuration and a means disposed on each end of the backing plate for securing such backing plate to a brake head. The brake shoe further includes a brake lining that is affixed to the backing plate and has a braking surface engageable with the wheel tread of a railroad car wheel.

20 Claims, 3 Drawing Sheets

KEYLESS ATTACHMENT OF BRAKE SHOES

FIELD OF THE INVENTION

The present invention relates, in general, to brake shoes and brake heads for railway vehicles; i.e., railway cars, transit cars and locomotives and, more particularly, the present invention relates to a keyless attachment of a brake shoe to the brake head.

BACKGROUND OF THE INVENTION

Railway vehicles traditionally use a braking system wherein a brake shoe is forced against the wheel surface of the vehicle to provide a retarding force. The brake shoe is mounted to a brake head that is used to locate the brake shoe and provide the braking force to the brake shoe.

These railway brake shoes are typically mounted on such brake rigging of railway vehicles by means of a brake shoe key, which passes through a longitudinal slot in the brake shoe holder or brake head of the brake rigging and concurrently through mounting holes of the brake shoe backing plate. Such holes are normally located in a central "keybridge" area of the brake shoe backing plate. The keybridge area of the backing plate is generally formed in such a way that it is adapted to protrude into or intersect with a longitudinal slot in the brake head at or near the center of the brake head's length. Thus, the shoe is held in place in the brake head by this key that passes through openings in the brake head and the brake shoe as is seen in FIG. 1.

The brake shoe keys that are used to retain the brake shoes have a history of problems including not only working loose due to vibration but also breaking while in service. If either of these problems occur then the brake shoe will not be held in place properly and will not contact the wheel properly and more likely the brake shoe will fall off. If the brake shoe falls off then the brake head will contact the wheel during a brake application which results in both an unsafe brake application and possible detrimental damage to both the wheel and brake head. Further, the use of these brake shoe keys means that these keys must be kept in inventory and thus be available to maintenance personnel for attaching a new brake shoe.

SUMMARY OF THE INVENTION

The present invention provides a brake shoe adapted to engage the tread of a railroad car wheel via which such railroad car is guidably supported on a railed track. The brake shoe comprises a backing plate which has a predetermined configuration and a means disposed adjacent each end of the backing plate for securing such backing plate to a brake head. The brake shoe further includes a brake lining that is affixed to the backing plate and has a braking surface engageable with the wheel tread of a railroad car wheel.

OBJECTS OF THE INVENTION

Accordingly, it is a primary object of this invention to provide a new and improved brake shoe for railway vehicles having improved means for securing the brake shoe to the brake head.

Another object of this invention is to provide a brake shoe for railway vehicles wherein the means for securing the brake shoe to the brake head can be formed integrally as a portion of the backing plate of such brake shoe.

Yet another object of the present invention is to provide a brake shoe for railway vehicles wherein the means for securing the brake shoe to the brake head can be welded to the backing plate.

It is still another object of the present invention to provide a specially configured spring clip to secure the brake shoe to the brake head.

Another object of this invention is to provide a brake shoe for railway vehicles wherein the means for securing the brake shoe to the brake head can minimize damage to brake heads and wheels.

Still another object of the present invention is to provide a brake shoe for railway vehicles wherein the specially configured spring clip can reduce inventory.

Yet another object of this invention is to provide a brake shoe for railway vehicles wherein the means for securing the brake shoe to the brake head which will be cost effective.

Another object of this invention is to provide a brake shoe for railway vehicles wherein the means for securing the brake shoe to the brake head can be retrofitted to existing brake heads.

Still yet another object of this invention is to provide a brake shoe for railway vehicles wherein the means for securing the brake shoe to the brake head is easier to install.

These and other objects and advantages of this invention will become apparent after a full reading of the following detailed description, particularly, when read in conjunction with the attached drawings as described below and the appended claims.

Figure 1:
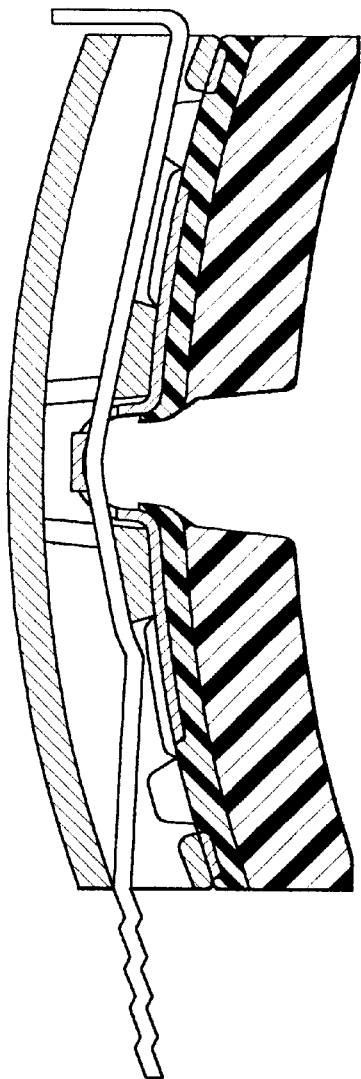
FIG. 1 is a side elevation view of a prior art type brake head and brake shoe having a brake key for securing the brake shoe to the brake head.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Reference is now made to FIGS. 2 through 5. Illustrated therein are embodiments of the invention wherein a brake shoe, generally designated 10, is secured to a brake head, which is generally designated 20. The brake shoe 10 of the present invention is adapted to engage the tread of a railroad car wheel (not shown). Such brake shoe 10 includes backing plate 4 and a brake lining 2. Such brake lining 2 may be one of a composition type brake lining that is generally used in the industry today, a wooden lining or a cast iron lining. However, it is presently preferred that such lining be the composition type lining.

Figure 2:
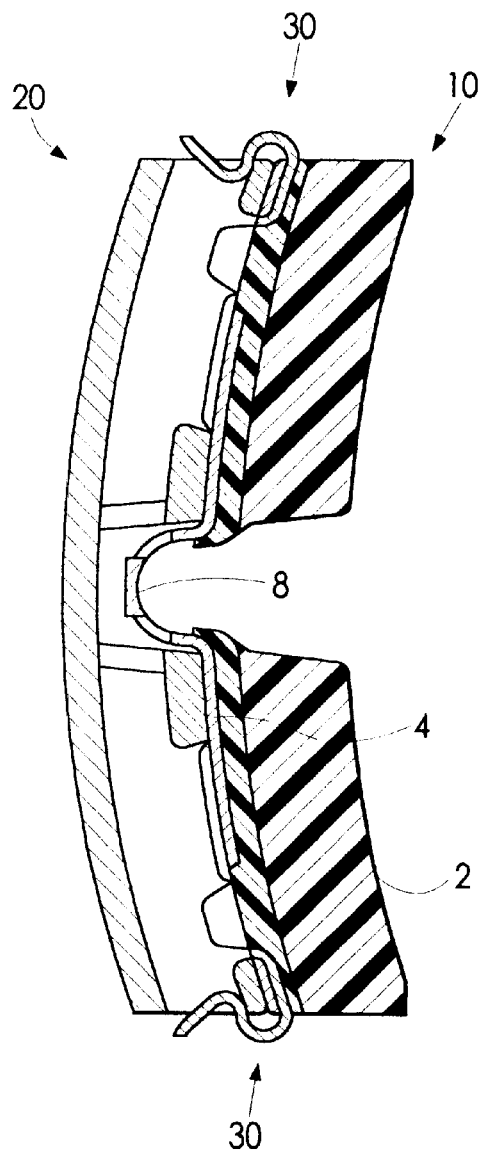
FIG. 2 is a side elevation view of a brake head and brake shoe showing a presently preferred embodiment of the invention for securing the brake shoe to the brake head.
Figure 3:
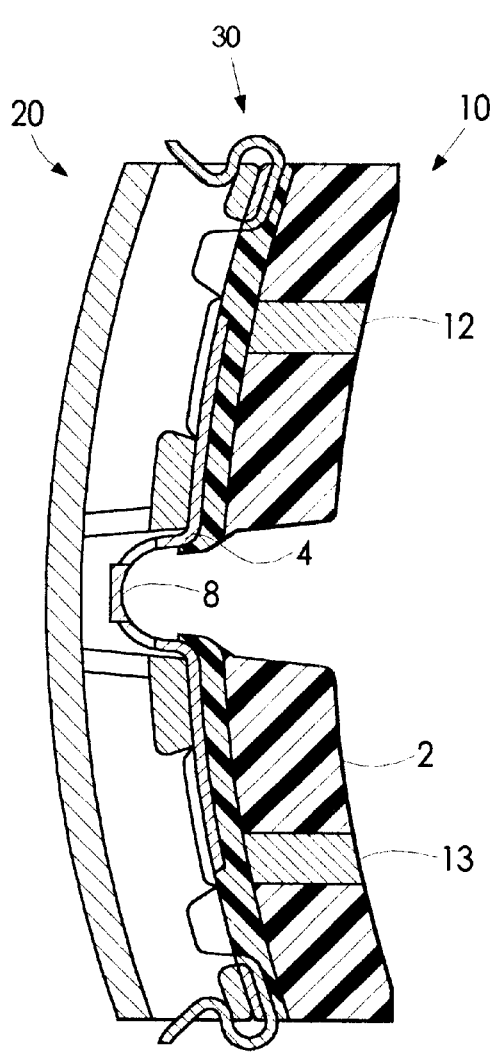
FIG. 3 is a side elevation view of a brake head and brake shoe showing a presently preferred embodiment of the invention for securing the brake shoe to the brake head according to an alternate embodiment of the brake shoe.
Figure 4:
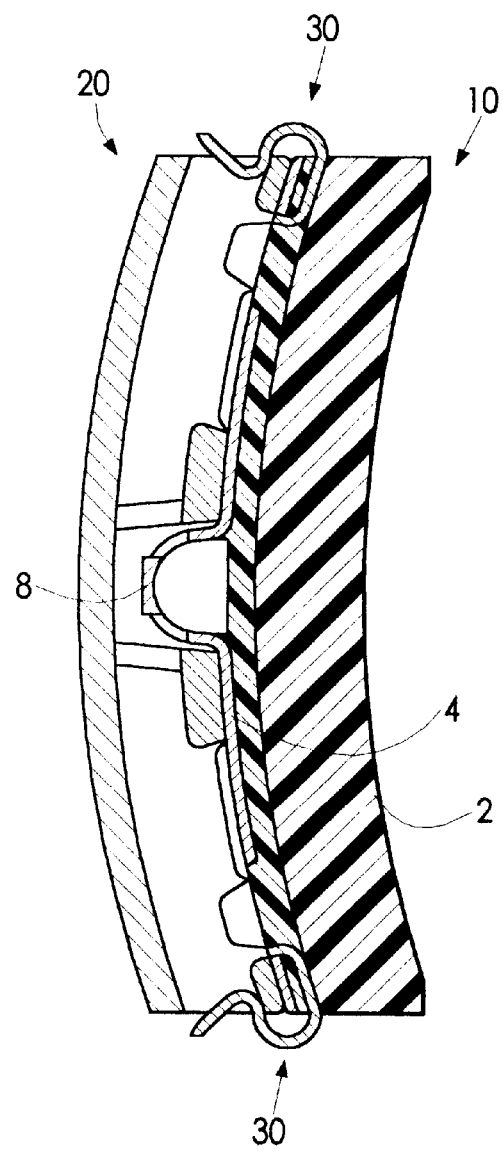
FIG. 4 is a side elevation view of a brake shoe showing a presently preferred embodiment of the invention for securing the brake shoe to the brake head according to another alternate embodiment of the brake shoe.
Figure 5:
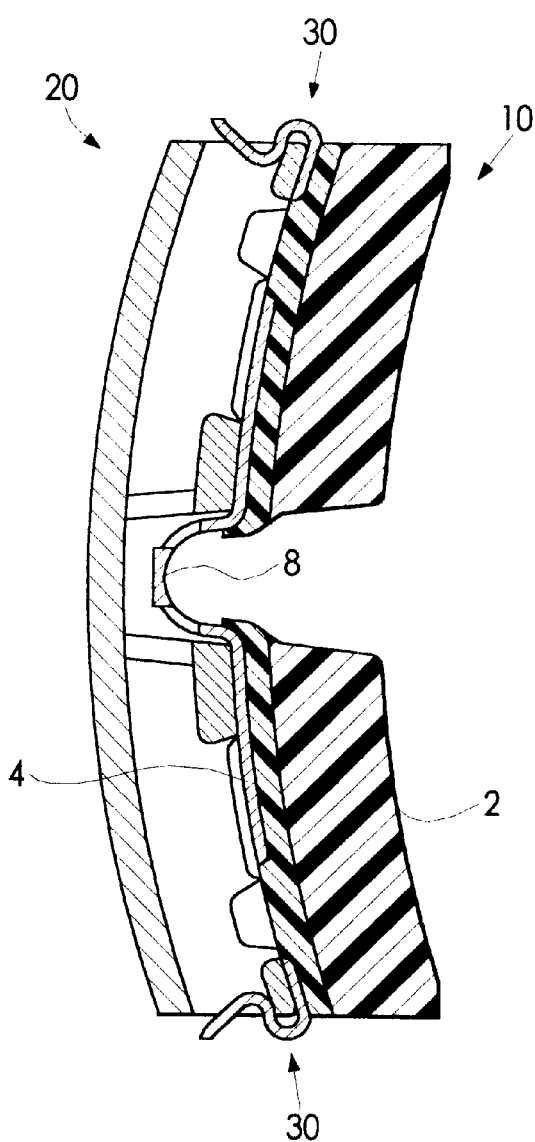
FIG. 5 is a side elevation view of a brake head and brake shoe showing an alternate embodiment of the invention for securing the brake shoe to the brake head.

In the type of brake shoe 10 shown in FIGS. 2 and 3 such brake lining 2 consists of two segments that are disposed on opposite sides of a midpoint of a key bridge 8 of the backing plate 4. Although FIGS. 2 and 3 show the brake lining 2 as two segments, the present invention is not limited to this type of brake shoe 10 but is equally applicable to such brake shoes where the brake lining 2 is formed as one single segment as is seen in FIG. 4.

Such brake lining 2 is affixed to the backing plate 4. The present invention provides a means, generally designated 30, disposed on the backing plate 4 for securing such backing plate 4 and such brake shoe 10 to the brake head 20. In a presently preferred embodiment of the invention such means 30 is a retaining clip 30. It is also presently preferred that such retaining clip 30 be made of spring steel. In one embodiment of the invention such means 30 may be affixed to the backing plate 4 by welding, crimping, bolting and by use of an adhesive. In another embodiment, as is evident in FIG. 5, such means 30 can be formed as an integral part of the backing plate 2. In either case the means 30 is used to secure the backing plate 4 to the brake head 20.

Such means 30 is also referred to as a retaining clip 30 and is affixed to or is part of backing plate 4. Two retaining clips 30 are used in securing such brake shoe 10 to the brake head 20, one retaining clip 30 is disposed on each end of backing plate 4. In the embodiment where such retaining clip 30 is affixed to the backing plate 4 such brake lining 2 of the brake shoe 10 is molded or formed around a portion of such retaining clip 30. In the type of brake shoe 10 shown in FIG. 2 each segment of brake lining 2 is molded around a part of a respective retaining clip 30.

One means for attaching such retainer clips 30 to the backing plate 2 in the embodiment in which such retainer clip(s) 30 are affixed to the backing plate 4 is by welding. Other methods would be by bolting, crimping or with the use of an adhesive. These retainer clips 30 are made of a suitable material which would permit them to deflect so as to allow the brake shoe 10 to be applied to the brake head 20, and then the retainer clips 30 would return to their normal position. In a presently preferred embodiment of the invention such retainer clip 30 is made of spring steel.

In the embodiment in which such retainer clips 30 are formed as an integral part of the backing plate 4, the forming would occur at the time the backing plate was formed. The retaining clips 30 would still deflect so as to allow the brake shoe 10 to be applied to the brake head 20, and then the retainer clips 30 would return to their normal position.

These retaining clips 30 as seen in the various Figures would reduce the likelihood of movement of the brake shoe 10 or the loss of the brake shoe 10 as has occurred in the past in which a key was used to secure the brake shoe 10 to the brake head 20. In the present invention the brake shoe 10 is engaged with the brake head 20 without the use of a key. Since keys are not a necessary item they would no longer have to be stocked or used by maintenance personnel in changing brake shoes.

The cost of the brake shoes that are configured with retainer clips 30 being integrally affixed to the backing plate 4 or as an integral part of the backing plate 4 may present an increase in the cost of the brake shoe 10. However, this cost is more than offset by the safety factor of having a brake shoe 10 that will be more secure to the brake head 20. Increased safety cannot be measured in dollars. Also, the time saved by maintenance personnel in applying a brake shoe 10 to the brake head 20 along with the additional savings of not being required to produce and store keys will in the long run probably result in the present invention being a cost saving rather than an additional expense even if the cost of forming the brake shoe may be slightly higher.

The retainer clip 30 applies sufficient force to support the weight of the brake shoe 10 and resist the effects of vibration of the brake head 20. The retainer clips 30 are not intended to support the forces applied to the brake shoe during braking. Such braking loads are supported by other features of the brake shoe, the backing plate and the brake head.

The design of the retainer clips 30 are intended to fit existing brake heads that meet the specification of the American Association of Railroads. No modification of the brake heads would be needed to use the new brake shoes. The design of the retainer clips 30 would accommodate changes to the dimensions as would be expected during normal wear.

In an alternate embodiment of the invention, as seen in FIG. 3, such first composition brake lining 2 may further include a discrete insert 12 and 13 of a different material than the material of the composition lining 2. Such discrete insert(s) 12 and 13 have a predetermined shape. The discrete inserts 12 and 13 are completely embedded within such brake lining 2. Discrete inserts 12 and 13 are a friction material that is different than the friction material used for brake lining 2. In a preferred embodiment of the invention such discrete inserts 12 and 13 consist essentially of an abrasive material used to condition the tread portion of a brake wheel (not shown) during normal braking operations. Such abrasive material is selected from one of cast iron, sintered iron and a ceramic grinding material such as that used for grinding wheels. It is presently preferred that discrete inserts 12 and 13 be made of the same material; however, it is within the concept of the invention that such insert 12 and such insert 13 be made of different materials. One concept could be that insert 12 or 13 be made of cast iron for conditioning the wheel tread while the other insert 12 or 13 be made of a lubricant, such as molybdenum disulfide, graphite or mixtures thereof, so as to provide lubrication.

Figure 6:
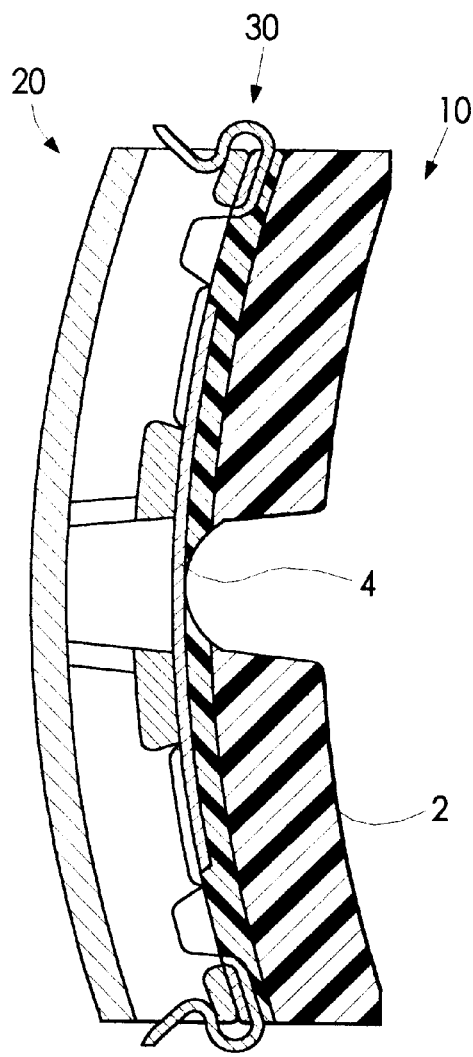
FIG. 6 is a side elevation view of a brake head and brake shoe showing a presently preferred embodiment of the invention for securing the brake shoe to the brake head in which the backing plate is formed without a keybridge.

As is evident in FIG. 6 the backing plate is formed without a keybridge. With the use of retaining clips 30 to secure such brake shoe 10 to a brake head 20 the backing plate no longer has a need for a keybridge since keys are no longer a requirement in installing a new brake shoe.

While both the presently preferred and a number of alternative embodiments of the present invention have been described in detail above it is understood that various other adaptations and modifications of the present invention can be envisioned by those persons who are skilled in the relevant art of brake shoes and railway braking systems without departing from either the spirit of the invention or the scope of the appended claims.

We claim:

1. A brake shoe adapted to engage the tread of a railroad car wheel via which such railroad car is guidably supported on a railed track, said brake shoe comprising:

(a) a backing plate having a predetermined configuration;

(b) a means disposed adjacent each end of said backing plate for securing said backing plate to a brake head; and (c) a brake lining affixed to said backing plate and having a braking surface engageable with such wheel tread.

2. The brake shoe, according to claim 1, wherein said means for securing said backing plate to such brake head is integrally formed as a single unit with said backing plate.

3. The brake shoe, according to claim 1, wherein said means for securing said backing plate to such brake head is attached to said backing plate by at least one of welding, bolting, crimping and adhesives.

4. The brake shoe, according to claim 1, wherein said means for securing said backing plate to a brake head is formed as a retaining clip.

5. The brake shoe, according to claim 4, wherein said retaining clip is formed from spring steel.

6. The brake shoe, according to claim 3, wherein said brake lining is molded around a predetermined portion of said means for securing said backing plate to a brake head.

7. The brake shoe, according to claim 1, wherein said backing plate further includes a key bridge.

8. The brake shoe, according to claim 7, wherein said brake lining includes a first segment and a second segment disposed on opposite sides of a midpoint of said key bridge of said backing plate.

9. The brake shoe, according to claim 1, wherein said brake lining is affixed to said backing plate as a single segment.

10. The brake shoe, according to claim 1, wherein said brake lining is selected from one of cast iron, wood and a composition type material.

11. The brake shoe, according to claim 10, wherein said brake lining is a composition type material.

12. The brake shoe, according to claim 11, wherein said composition lining further includes at least one discrete insert of a different material having a predetermined shape, said discrete insert being embedded within said composition lining.

13. The brake shoe, according to claim 12, wherein said at least one discrete insert is selected from one of cast iron, sintered iron and a ceramic grinding material used for grinding wheels.

14. The brake shoe, according to claim 12, wherein said at least one discrete insert consists of a lubricating material.

15. The brake shoe, according to claim 14, wherein said lubricating material is selected from a group consisting of molybdenum disulfide, graphite and mixtures thereof.

16. The brake shoe, according to claim 8, wherein said brake lining is a composition type lining.

17. The brake shoe, according to claim 16, wherein said composition lining further includes at least one discrete insert of a different material having a predetermined shape, said discrete insert being completely embedded within at least one of said first segment and said second segment of said composition lining of said brake shoe.

18. The brake shoe, according to claim 17, wherein said composition lining further includes two discrete inserts, one of said two discrete inserts being completely embedded within one of said first segment and said second segment of said composition lining of said brake shoe and another one of said two discrete inserts being completely embedded within an opposite one of said first segment and said second segment of said composition lining of said brake shoe.

19. The brake shoe, according to claim 18, wherein each of said two discrete inserts being completely embedded within said first segment and said second segment is formed of a similar abrasive material.

20. The brake shoe, according to claim 19, wherein each of said two discrete inserts being completely embedded within said first segment and said second segment are formed of different materials, one discrete insert being formed of an abrasive material and another discrete insert being formed of a lubricant.

* * * * *